(12) United States Patent
Hatton

(10) Patent No.: US 7,326,339 B1
(45) Date of Patent: Feb. 5, 2008

(54) RECIRCULATING WATER ENERGISING APPARATUS

(75) Inventor: Randy Hatton, HC71 Box 17a, Eagle Nest, NM (US) 87718

(73) Assignee: Randy Hatton, Eagle Nest, NM (US)

( * ) Notice: Subject to any disclaimer, the term of this patent is extended or adjusted under 35 U.S.C. 154(b) by 514 days.

(21) Appl. No.: 10/818,400

(22) Filed: Apr. 6, 2004

Related U.S. Application Data

(63) Continuation-in-part of application No. 10/264,532, filed on Oct. 4, 2002, now Pat. No. 6,797,159.

(60) Provisional application No. 60/330,129, filed on Oct. 16, 2001.

(51) Int. Cl.
*C02F 1/48* (2006.01)
*B04C 3/00* (2006.01)
(52) U.S. Cl. .................. 210/195.1; 210/222; 210/416.3
(58) Field of Classification Search ................ 210/695, 210/195.1, 209, 222, 223, 416.1, 416.3, 418
See application file for complete search history.

(56) References Cited

U.S. PATENT DOCUMENTS 5,540,835 A * 7/1996 Sanderson .................. 210/222
5,804,068 A * 9/1998 Reed .......................... 210/222

\* cited by examiner

*Primary Examiner*—David A Reifsnyder

(57) ABSTRACT

An apparatus for recirculating water through a magnetic field comprises: a) a funnel; b) a water injector configured to deliver water around an interior peripheral surface of a top portion of the funnel; c) a magnet positioned along and adjacent to the narrow spout of the funnel so that magnetic flux passes within the spout; d) a receptacle to collect the water discharged from the spout of the funnel; and, e) a recirculating system having a pump which pumps processed water from the receptacle to a top portion of the funnel. Over time water within the receptacle will have had multiple passes through the spout and will thereby be better magnetically energized. In a preferred aspect the above apparatus a funnel cover portion is used to enclose a top open portion of the funnel and to carry and directionally maintain the water injector. In one aspect of the invention the receptacle comprises an enclosed dispensing container, and in another aspect of the invention the receptacle comprises an open maintained reservoir.

11 Claims, 1 Drawing Sheet

RECIRCULATING WATER ENERGISING APPARATUS

REFERENCE TO PRIOR APPLICATION

This invention is a continuation-in-part of Randy Hatton's U.S. patent application Ser. No. 10/264,532, filed Oct. 4, 2002, now U.S. Pat. No. 6,797,159 B2 entitled "APPARATUS FOR RECIRCULATING VORTEX WATER FOUNTAIN", which claims the benefit of U.S. Provisional Application No. 60/330,219, filed Oct. 16, 2001.

FIELD OF THE INVENTION

This invention relates to apparatuses used to produce water energised by magnetism. More particularly this invention relates to a general purpose apparatus for magnetizing water having a pump and a recirculation system causing the water being treated to make multiple passes through a magnetic field in a vortex pattern.

BACKGROUND OF THE INVENTION

The health benefits of using water energised by magnetism or of using "living water" are accepted by a large number of individuals. As the baby boom progresses further into middle age and retirement ever larger numbers of individuals are becoming health conscious and concerned with the benefits of consuming and otherwise using living water. There is a growing demand for compact, portable, and self contained systems to produce living water for human consumption. The inventor, Randy Hatton, has found that water must be passed through his apparatus multiple times before it is fully energized. The inventor has negotiated to sell larger commercial systems for use in facilities attended by individuals who are health conscious. The inventor also projects demand for functionally similar larger systems which are used commercially for human bathing (including hot tubs) and recreational parks (including swimming pools and water gardens). The inventor additionally projects demand for functionally similar large systems which are used commercially for plant production (such as hydroponic greenhouses), as well as in fish farming (including shrimp production).

OBJECTS OF THE INVENTION

It is an object of this invention to disclose an apparatus which more effectively and more efficiently produces magnetically energized or "living" water. It is an object of this invention to disclose an apparatus which dispenses living water without the need for that water to be pressurized. It is yet a further object of this invention to disclose an apparatus which produces large quantities of living water for bathing and recreation. It is yet a further object of this invention to disclose an apparatus which produces living water for plant, fish or other animal production. It is a final object of this invention to disclose an apparatus having a aesthetic visual appearance.

One aspect of this invention provides for an apparatus for recirculating water through a magnetic field comprising: a) a funnel having a wide body and an elongate narrow spout; b) a water injector configured to deliver water around an interior peripheral surface of a top portion of the wide body of the funnel; c) a magnet positioned along and adjacent to the narrow spout so that magnetic flux therefrom passes through an interior space within the spout; d) a receptacle to collect the water discharged from the spout of the funnel; and, e) a recirculating system having a pump which pumps processed water from the receptacle through a conduit to a top portion of the funnel. Over time water within the receptacle will have had multiple passes through the elongate narrow spout and will thereby be better magnetically energised.

In a preferred aspect the above apparatus further comprises a funnel cover portion used to enclose a top open portion of the funnel and to carry and directionally maintain the water injector.

In one aspect of the invention the receptacle comprises an enclosed dispensing container, and in another aspect of the invention the receptacle comprises an open maintained reservoir.

Various other objects, advantages and features of this invention will become apparent to those skilled in the art from the following description in conjunction with the accompanying drawings.

FIGURES OF THE INVENTION

FIG. 1 is a cross sectional schematic view of a recirculating water energising apparatus. In the embodiment of the invention shown in FIG. 1 a receptacle shown therein is a dispensing receptacle.

Figure 2:
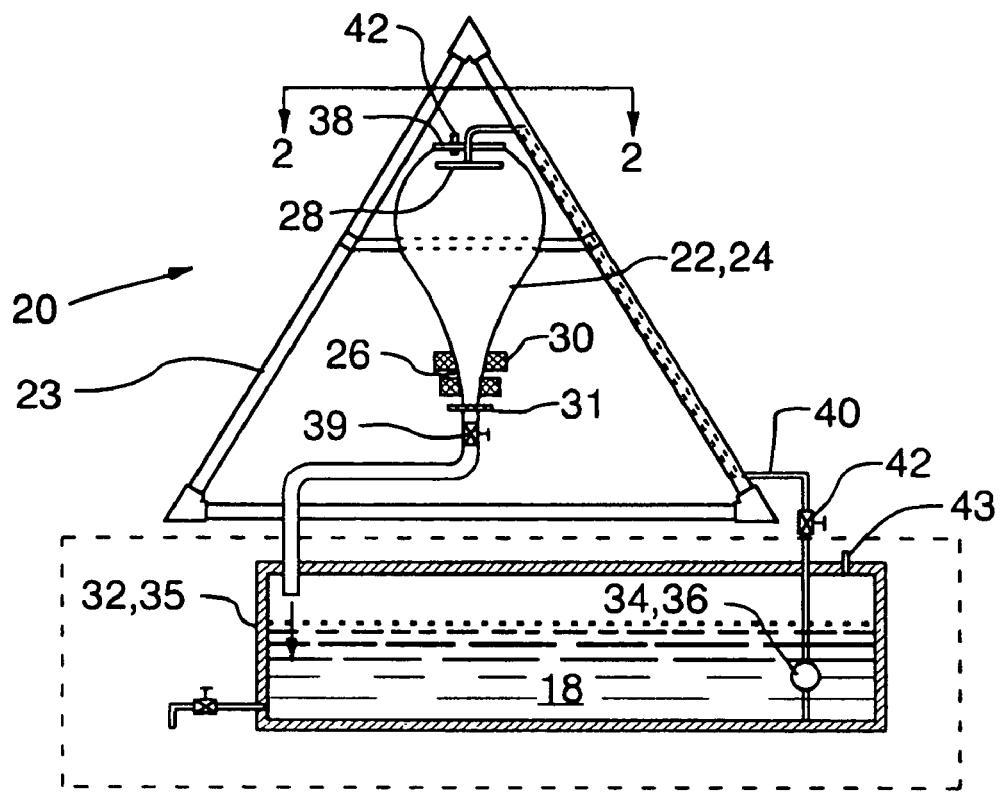
FIG. 2 is a cross sectional view of the apparatus shown in FIG. 1 taken along line 2-2 therein.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a cross sectional schematic view of a recirculating water energising apparatus 20. In the embodiment of the invention shown in FIG. 1 a receptacle 32 shown therein is a dispensing container 33. The apparatus 20 for recirculating water through a magnetic field comprises: a) a funnel 22 having a wide body 24 and an elongate narrow spout 26; b) a water injector 28 configured to deliver water around an interior peripheral surface of a top portion of the wide body 24 of the funnel 22; c) a magnet 30 positioned along and adjacent to the narrow spout 26 so that magnetic flux therefrom passes through an interior space within the spout 26; d) a receptacle 32 to collect the water 18 discharged from the spout 26 of the funnel 22; and, e) a recirculating system 34 having a pump 36 which pumps processed water from the receptacle through a conduit to a top portion of the funnel 22. Over time, water 18 within the receptacle 32 will have had multiple passes through the elongate narrow spout 26 and will thereby be more oxygenated and better magnetically energised.

In a preferred aspect of this invention the apparatus 20 further comprises a funnel cover portion 38 used to enclose a top open portion of the funnel 22. The funnel cover portion 38 carries and directionally maintains the water injector 28. Within this specification the water injector 28 is intended, and defined to include an end portion of a water supply line 40, even if that water supply line 40, does not have an end portion which is restricted in cross sectional area. And in the most preferred aspect of this invention the apparatus further comprises a valve 42 to adjust the flow rate and pressure of the water 18 which is circulating through the funnel 22. A valve 39 may be provided to regulate flow of water 18 exiting the funnel 22.

Most preferably the magnet(s) 30 adjacent to the elongate narrow spout 26 of the funnel 22 is configured to produce magnetic flux within an interior of the elongate spout 26 comparable to flux within an electromagnet (not shown). The magnet 30 herein is intended to comprise pairs of magnets 30, horse shoe magnets, or an electromagnet (neither shown). It should be noted that the funnel support 23 shown in FIG. 1 comprises the shape of a pyramid. The pyramid shape was chosen both for its aesthetic appearance and its esoteric energy producing ability. FIG. 1 also shows a volcanic soil ring 31 positioned around the neck 26 of the funnel 22. It is believed that this additionally positively energizes the water 18.

FIG. 2 is a cross sectional view of the apparatus 20 shown in FIG. 1 taken along line 2-2 therein. In the most preferred aspect of this invention the water injector 28 is configured to result in water spiraling down the wide body 24 of the funnel 22 in a vortex. In one aspect of the invention the funnel cover portion 38 is airtight with respect to the funnel 22 and the funnel cover 38 further comprises an air portal 42 to facilitate injection of a selected gas into the funnel 22. The recirculation of water 18 through the funnel 26 in and of itself tends to oxygenate the water 18 circulating through the funnel 22. The inventor contemplates that in some applications it might be advantageous to further oxygenate the water 18 by injecting oxygen into the funnel 22.

In yet another aspect of this invention the water injector 28 is a first water injector 44, and said apparatus 20 further comprises a reverse water injector 46, and a control valve 48 configured so that water 18 is selectively spiraled down the wide body 24 of the funnel 22 in a vortex in either one of a first direction or a reverse direction which is tangentially opposite to that of water 18 injected through the first injector 44. If the system is enclosed a gas portal 43 may be positioned in a top portion of the dispensing container. Oxygen may be injected into the circulating water 18 through the gas portal 43.

As shown in FIG. 1 the receptacle 32 comprises a dispensing container 33 positioned beneath the elongate spout 26 of the funnel 22. The dispensing container 33 may be enclosed and the funnel 26, the cover 38, and the recirculation system 34 therein may thereby comprise an isolated system which excludes entry of outside air. It is contemplated that the receptacle 32 would comprise a dispensing container 33 in a recirculating water energising apparatus 20 whenever either large or small quantities of living water were produced for human consumption, plant production (such as hydroponic greenhouses), or animal consumption.

Figure 3:
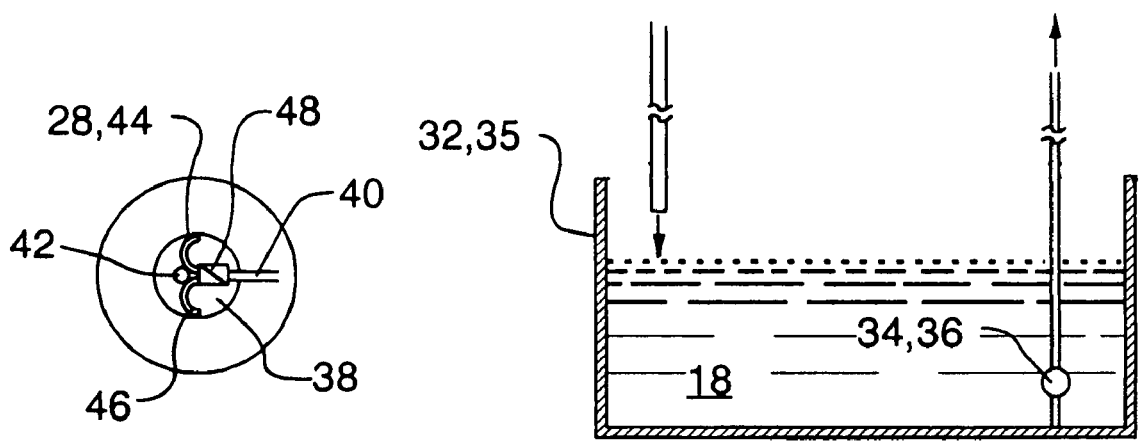
FIG. 3 is a cross sectional schematic view of an alternative receptacle which comprises a large open reservoir. The large open reservoir is used with the recirculating water energising apparatus shown in FIG. 1 rather than the receptacle shown therein within the dashed block.

FIG. 3 is a cross sectional schematic view of an alternative receptacle which comprises a large open reservoir 35. The large open reservoir 35 is used with the recirculating water energising apparatus 20 shown in FIG. 1 rather than the receptacle 33 shown therein within the dashed block. As above, water 18 in the reservoir, is conveyed from, and recirculated to the funnel 22 by the recirculating system 34. Water in the reservoir 25 is aerated and maintained at an acceptable energised level. It is contemplated that the functionally similar recirculating water energising apparatus 20 as shown in FIG. 3 would be used wherever large quantities of living water were maintained for human bathing (including hot tubs) and recreation (including swimming pools). The inventor additionally projects demand for functionally similar large systems which are used commercially for fish farming (including shrimp production).

While the invention has been described with preferred specific embodiments thereof, it will be understood that this description is intended to illustrate and not to limit the scope of the invention, which is defined by the following claims.

I claim:

1. An apparatus for recirculating water through a magnetic field comprising:
    a) a funnel having a wide body and an elongate narrow spout;
    b) a water injector configured to deliver water around an interior peripheral surface of a top portion of the wide body of the funnel;
    c) a magnet positioned along and adjacent to the narrow spout so that magnetic flux therefrom passes through an interior space within the spout;
    d) a receptacle to collect the water discharged from the spout of the funnel; and,
    e) a recirculating system having a pump which pumps water from the receptacle through a conduit to a top portion of the funnel;
    so that over time water within the receptacle will have had multiple passes through the elongate narrow spout and will thereby be better magnetically energised.

2. An apparatus as in claim 1 further comprising a funnel cover portion used to enclose a top open portion of the funnel and to carry and directionally maintain the water injector.

3. An apparatus as in claim 2 further comprising a valve to adjust the flow rate and pressure of the recirculating water.

4. An apparatus as in claim 2 wherein the magnet adjacent to the elongate narrow spout of the funnel is configured to produce magnetic flux within an interior of the elongate spout comparable to flux within an electromagnet.

5. An apparatus as in claim 2 wherein the water injector is configured to result in water spiraling down the wide body of the funnel in a vortex.

6. An apparatus as in claim 5 wherein the funnel cover is airtight with respect to the funnel and wherein the funnel cover further comprises an air portal to facilitate injection of a selected gas into the funnel.

7. An apparatus as in claim 6 wherein the water injector is a first water injector, and wherein said apparatus further comprises a reverse water injector, and a control valve configured so that water is selectively spiraled down the wide body of the funnel in a vortex in one of a first direction and a reverse direction which is tangentially opposite to that of water injected through the first injector.

8. An apparatus as in claim 2 wherein the receptacle comprises a dispensing container positioned beneath the elongate spout of the funnel.

9. An apparatus as in claim 8 wherein the receptacle comprises an enclosed dispensing container and wherein the funnel, cover, dispensing container, and recirculation system comprise an isolated system which excludes entry of outside air.

10. An apparatus as in claim 9 further comprising a gas portal positioned in a top portion of the dispensing container for connection of a vacuum line to facilitate greater production of treated water through the elongate narrow spout of the funnel.

11. An apparatus as in claim 2 wherein the receptacle comprises a large open reservoir, and wherein water is conveyed from, and recirculated to the funnel by the recirculating system; so that the water in the reservoir is aerated and maintained at an acceptable energised level.

\* \* \* \* \*